(12) United States Patent
Kuno et al.

(10) Patent No.: US 7,607,735 B2
(45) Date of Patent: Oct. 27, 2009

(54) VEHICLE SEATS

(75) Inventors: Satoru Kuno, Aichi-ken (JP); Tokuyuki Nishikawa, Toyota (JP); Yasushi Saotome, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/062,750

(22) Filed: Apr. 4, 2008

(65) Prior Publication Data

US 2008/0252123 A1    Oct. 16, 2008

(30) Foreign Application Priority Data

Apr. 10, 2007  (JP) .............................. 2007-102619

(51) Int. Cl.
*B60N 2/62* (2006.01)
(52) U.S. Cl. .................................. 297/284.6
(58) Field of Classification Search ............. 297/284.9, 297/411.35, 411.36
See application file for complete search history.

(56) References Cited

U.S. PATENT DOCUMENTS

| | | | |
|---|---|---|---|
| 4,500,136 A | | 2/1985 | Murphy et al. |
| 4,536,030 A | * | 8/1985 | Sakurada et al. ......... 297/284.9 |
| 4,537,444 A | * | 8/1985 | Maruyama et al. ....... 297/284.9 |
| 4,636,000 A | * | 1/1987 | Nishino .................... 297/284.9 |
| 5,280,997 A | * | 1/1994 | Andres et al. ............ 297/284.9 |
| 5,328,236 A | * | 7/1994 | Mizushima et al. ...... 297/284.9 |
| 6,039,402 A | * | 3/2000 | Nemoto .................. 297/411.34 |
| 6,659,553 B2 | | 12/2003 | Achleitner et al. |
| 7,125,077 B2 | * | 10/2006 | Frank ....................... 297/284.9 |
| 7,322,652 B1 | * | 1/2008 | Tache ...................... 297/284.9 |

FOREIGN PATENT DOCUMENTS

| | | |
|---|---|---|
| JP | 61-37544 | 2/1986 |
| JP | 62-56447 U | 4/1987 |
| JP | 11-151959 | 6/1999 |

OTHER PUBLICATIONS

English language Abstract of JP 61-37544.
English language Abstract of JP 11-151959.

(Continued)

*Primary Examiner*—Peter R. Brown
(74) *Attorney, Agent, or Firm*—Greenblum & Bernstein, P.L.C.

(57) ABSTRACT

A vehicle seat may include a seat cushion that includes a central portion, first and second side support portions, and a vertical moving mechanism. The first and second side support portions are capable of laterally supporting femoral portions of a passenger. The vertical moving mechanism is capable of vertically moving the first and second side support portions in synchronism with each other, so as to change heights of the first and second side support portions relative to the central portion. The vertical moving mechanism is arranged and constructed to vertically move each of the first and second side support portions within a use range thereof in which each of the first and second side support portions has side support function. The vertical moving mechanism is arranged and constructed to further vertically move the second side support portion downwardly beyond the use range to a release position in which the second side support portion does not have the side support function.

2 Claims, 6 Drawing Sheets

OTHER PUBLICATIONS

U.S. Appl. No. 11/875,255 to Wissner et al., which was filed on Oct. 19, 2007.

U.S. Appl. No. 11/876,919 to Wissner et al., which was filed on Oct. 23, 2007.

U.S. Appl. No. 12/018,930 to Takai et al., which was filed on Jan. 24, 2008.

U.S. Appl. No. 12/019,182 to Takai et al., which was filed on Jan. 24, 2008.

U.S. Appl. No. 12/062,115 to Kuno, which was filed on Apr. 3, 2008.

U.S. Appl. No. 12/062,086 to Nishikawa et al., which was filed on Apr. 3, 2008.

U.S. Appl. No. 12/121,890 to Fukuda et al., which was filed on May 16, 2008.

* cited by examiner

VEHICLE SEATS

This application claims priority to Japanese patent application serial number 2007-102619, the contents of which are incorporated herein by reference.

BACKGROUND OF THE INVENTION

The present invention relates to vehicle seats. More particularly, the present invention relates to vehicle seats each having a seat cushion.

A vehicle seat having a seat cushion with a side support function is already known. The side support function of the seat cushion may increase restraint performance of a passenger sitting on the seat. In the vehicle seat, the seat cushion is provided with raised (upwardly projected) side support portions, so that femoral portions of the passenger can be laterally supported thereby. The side support portions are respectively disposed in side peripheries of the seat cushion. The side support portions are arranged and constructed to be respectively vertically moved, so that travel distances of the side support portions can be changed. As a result, the restraint performance of the femoral portions of the passenger can be changed. Such a vehicle seat is taught, for example, by Japanese Laid-Open Patent Publication Number 62-56447.

Conversely, a vehicle seat having a seat back with a side support function is already known. In the vehicle seat, the seat back is provided with raised (forwardly projected) side support portions, so that body side portions of the passenger can be laterally supported thereby. The side support portions are respectively disposed in side peripheries of the seat back. The side support portions are arranged and constructed to be respectively moved back and forth, so that travel distances of the side support portions can be changed. As a result, the restraint performance of the body side portions of the passenger can be changed. Further, one of the side support portions is arranged and constructed to be manually moved to a retracted position, so that the side support portion cannot interfere with the passenger when the passenger gets in and out of the vehicle seat. Such a vehicle seat is taught, for example, by Japanese Laid-Open Patent Publication Number 61-37544.

BRIEF SUMMARY OF THE INVENTION

However, the known vehicle seat still are in need of improvement. That is, there is a need in the art for an improved vehicle seat.

For example, in one aspect of the present invention, a vehicle seat may include a seat cushion that includes a central portion, first and second side support portions, and a vertical moving mechanism. The first and second side support portions are capable of laterally supporting femoral portions of a passenger. The vertical moving mechanism is capable of vertically moving the first and second side support portions in synchronism with each other, so as to change heights of the first and second side support portions relative to the central portion. The vertical moving mechanism is arranged and constructed to vertically move each of the first and second side support portions within a use range thereof in which each of the first and second side support portions has side support function. The vertical moving mechanism is arranged and constructed to further vertically move the second side support portion downwardly beyond the use range to a release position in which the second side support portion does not have the side support function.

According to the vehicle seat thus constructed, the heights of the first and second side support portions relative to the seat cushion central portion can be freely changed. Therefore, restraint performance of the femoral portions of the passenger can be controlled for body size of the passenger. In addition, the first and second side support portions can be vertically moved in synchronism with each other. Therefore, the heights thereof can be simultaneously changed. Moreover, the second side support portion can be moved downwardly beyond the use range to the release position. Therefore, the passenger can smoothly get in and out of the vehicle seat.

In one embodiment, the vertical moving mechanism may include first and second drive mechanisms that are respectively linked to the first and second side support portions. The first drive mechanism may include a drive force absorption mechanism that can prevent a drive force from transmitting to the first side support portion when the first side support portion reaches a lowermost use position.

According to this embodiment, when the first side support portion reaches the lowermost use position, the first drive mechanism can be idly driven due to the drive force absorption mechanism. Thus, the drive force can be effectively prevented from transmitting to the first side support portion.

In another embodiment, the first drive mechanism may preferably include a first member having an elongated slot and a second member having a pin. The pin slidably engages the elongated slot, thereby forming the drive force absorption mechanism that can absorb the drive force.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 7.

First Detailed Representative Embodiment

A first detailed representative embodiment of the present invention will be described with reference to FIGS. 1 to 6.

Figure 1:
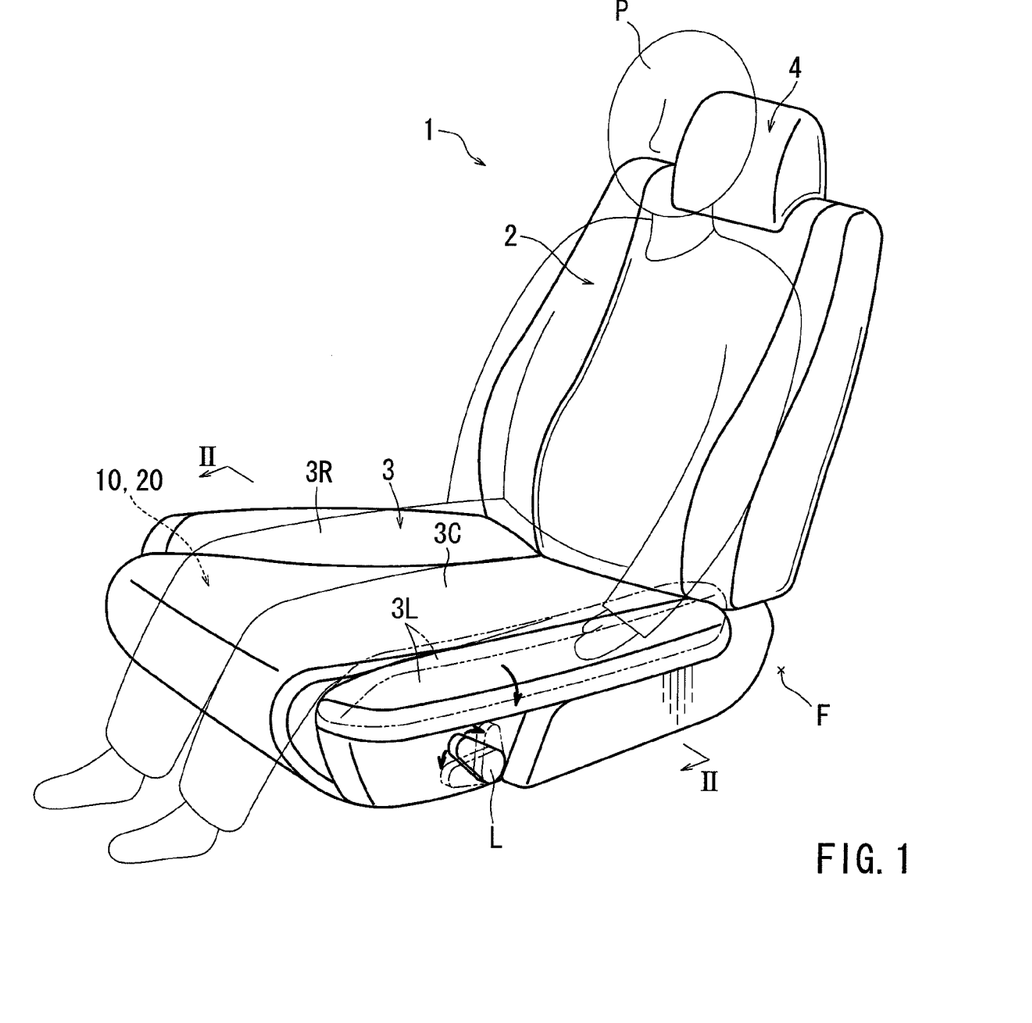
FIG. 1 is a perspective view of a vehicle seat according to a first representative embodiment of the present invention.

As shown in FIG. 1, a representative vehicle seat 1 may preferably be arranged as a rear left seat of a vehicle and include a seat back 2 having a head rest 4 and a seat cushion 3.

Figure 2:
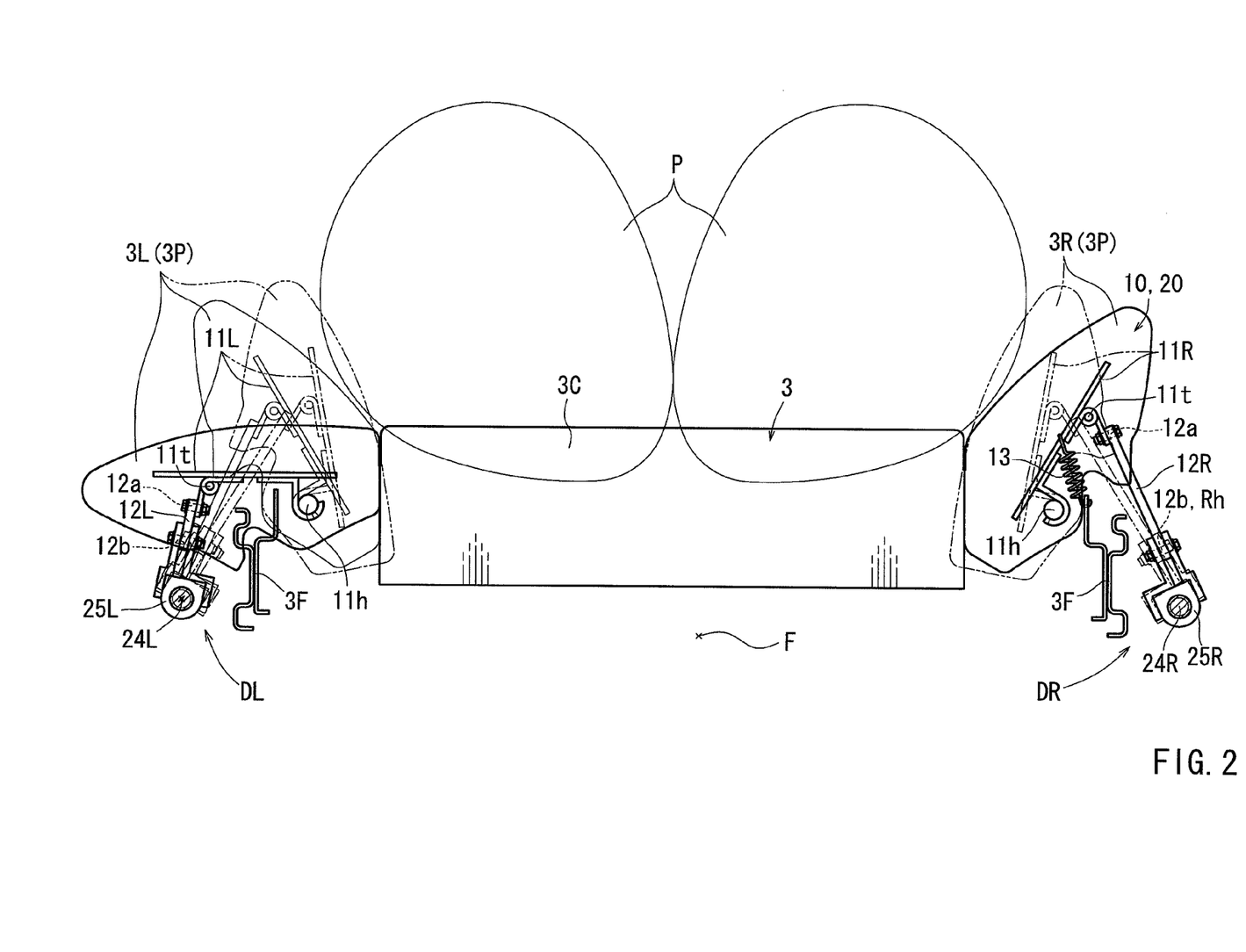
FIG. 2 is a cross-sectional view taken along line II-II in FIG. 1, which illustrates motion of first and second side support portions of a seat cushion.

The seat cushion 3 is composed of a central portion 3C and a pair of (right and left or first and second) side support portions 3R and 3L. The side support portions 3R and 3L are respectively positioned at an inner (right) side that is spaced away from a vehicle door opening (not shown) and an outer (left) side that is adjacent to the vehicle door opening. The side support portions 3R and 3L are respectively arranged and constructed to laterally support femoral portions of a passenger P. The side support portions 3R and 3L are respectively vertically movably disposed in side peripheries of the seat cushion central portion 3C. The side support portions 3R and 3L thus positioned are respectively connected to a vertical moving mechanism 10. As shown in FIG. 2, the vertical moving mechanism 10 is arranged and constructed to change lateral (rightward and leftward) tilting angles of the side support portions 3R and 3L relative to the seat cushion central portion 3C, thereby vertically moving the side support portions 3R and 3L relative to the central portion 3C. As a result, distances or heights of the side support portions 3R and 3L relative to the central portion 3C may preferably be changed.

Figure 3:
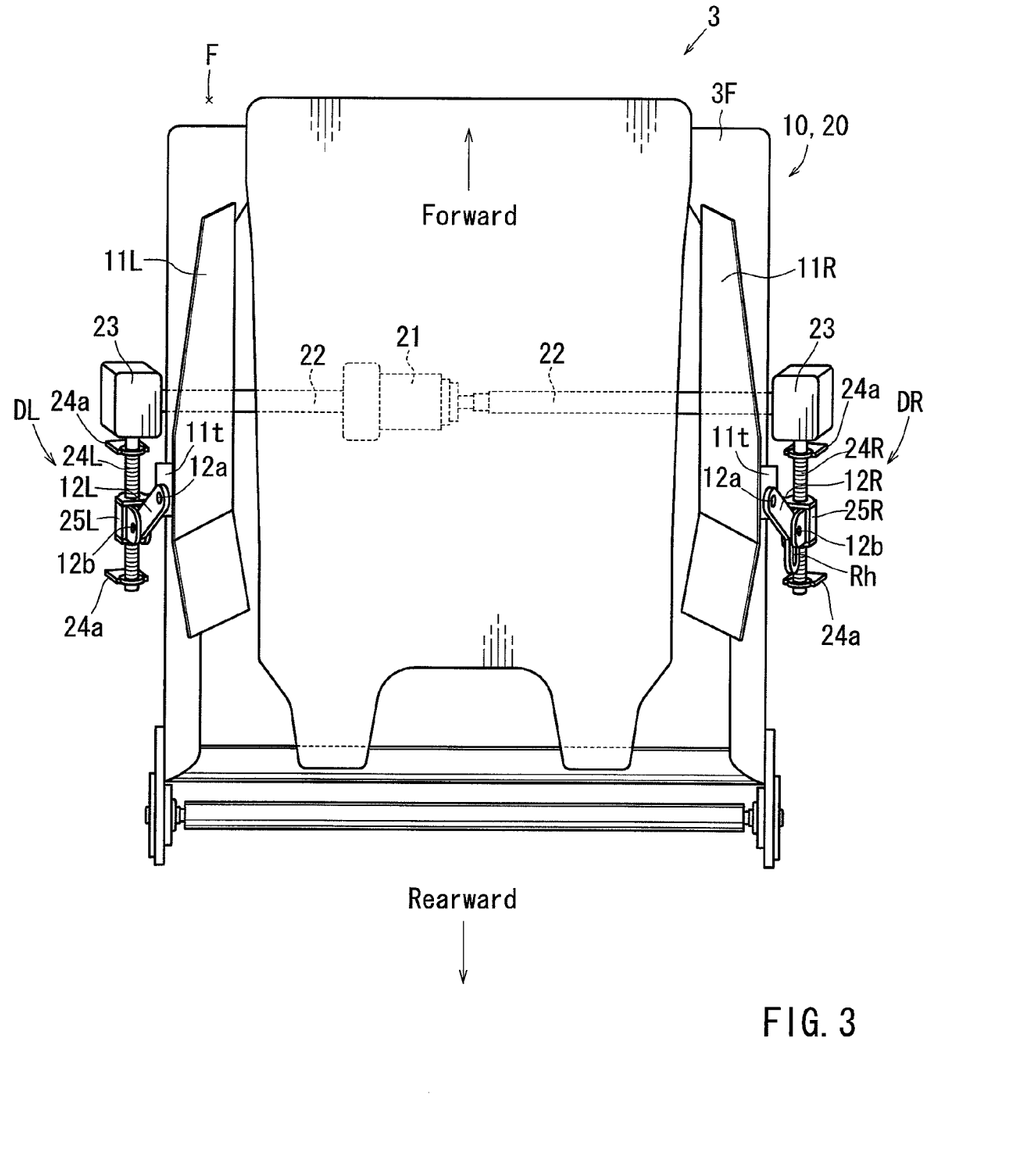
FIG. 3 is a plan view of the seat cushion, which illustrates a framework or inner structure thereof.
Figure 4:
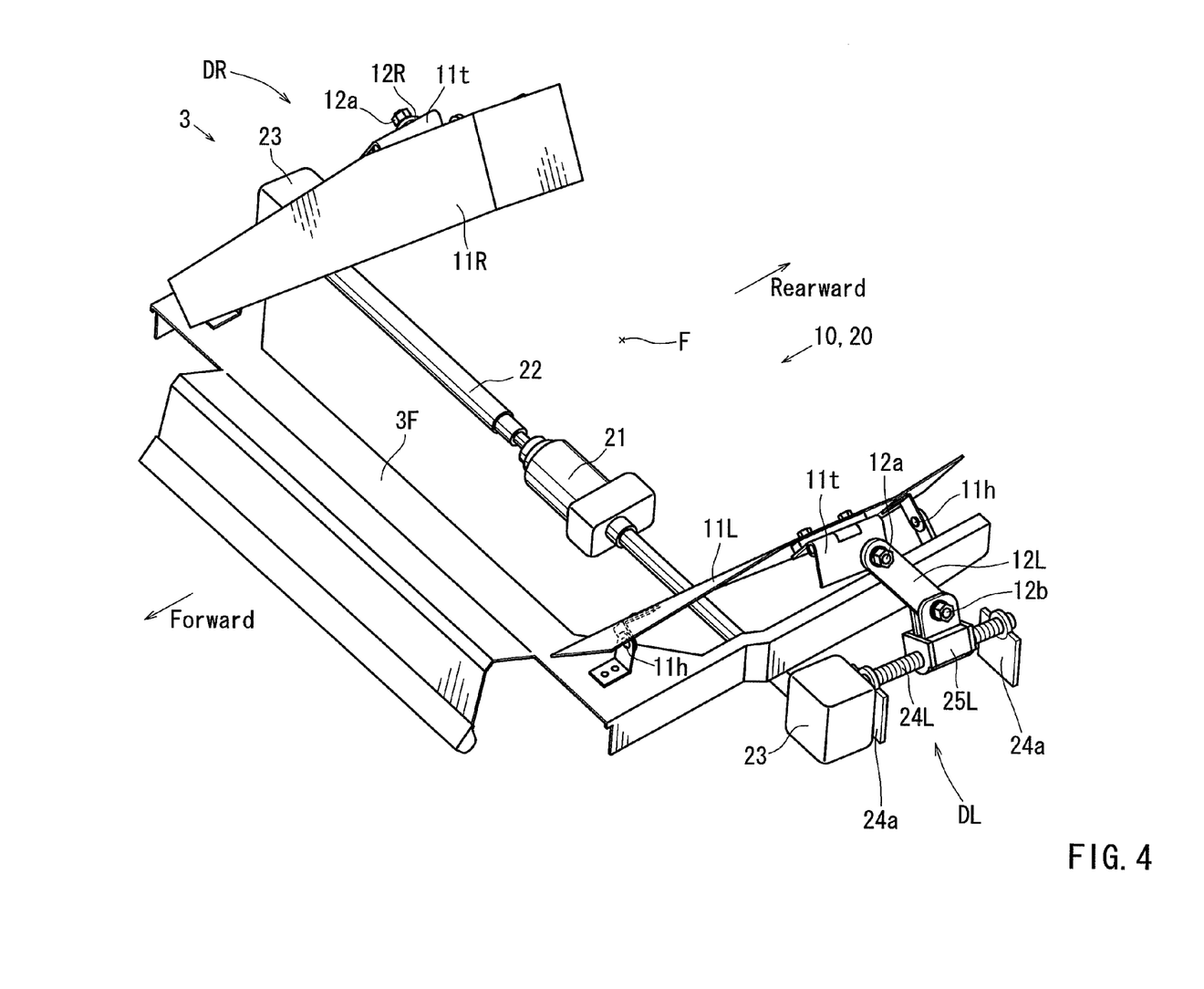
FIG. 4 is a perspective view of the seat cushion, which illustrates the framework or inner structure thereof.

The vertical moving mechanism 10 may preferably include a vertical moving device 20. The vertical moving device 20 has a motor 21, a pair of (first and second) drive mechanisms DR and DL that are coupled to drive shafts 22 of the motor 21 via couplers 23 (FIG. 3). As shown in FIG. 2, the vertical moving mechanism 10 further includes a pair of vertical moving or tilting plates 11R and 11L that are respectively embedded in cushion pads 3P of the side support portions 3R and 3L. Each of the tilting plates 11R and 11L is laterally rotatably or tiltably attached to a cushion frame 3F via a pair of (front and rear) hinge pins 11h (FIG. 4). Further, the tilting plates 11R and 11L are respectively movably linked to the drive mechanisms DR and DL of the vertical moving device 20, so as to be laterally tilted as indicated by solid and broken lines in FIG. 2 when the drive motor 21 is actuated. Therefore, upon actuation of the drive motor 21, the side support portions 3R and 3L can be laterally tilted as indicated by solid and broken lines in FIG. 2, so that the heights of the side support portions 3R and 3L relative to the seat cushion central portion 3C can be changed.

Further, the vertical moving mechanism 10 (the vertical moving device 20) is arranged and constructed such that the side support portions 3R and 3L (the tilting plates 11R and 11L) can be laterally tilted in substantially synchronism with each other when the drive motor 21 is actuated.

Thus, restraint performance of the femoral portions of the passenger P can be adjusted for body size of the passenger P because the heights of the side support portions 3R and 3L relative to the seat cushion central portion 3C can be changed.

As best shown in FIG. 2, the drive mechanism DL of the vertical moving device 20 is generally arranged and constructed to tilt the side support portion 3L (the tilting plate 11L) within a use range thereof in which the side support portion 3L substantially has side support function, i.e., between an uppermost use position shown by broken lines and a lowermost use position shown by thin solid lines. Also, the drive mechanism DL is arranged and constructed to further tilt the side support portion 3L (the tilting plate 11L) downwardly until the side support portion 3L reaches a position or condition in which it is substantially flush with the central portion 3C of the seat cushion 3 as shown by bold solid lines. In other words, the drive mechanism DL is arranged and constructed to further tilt the side support portion 3L (the tilting plate 11L) downwardly beyond the use range until the side support portion 3L reaches a (substantially horizontal) position or condition in which it does not substantially have the side support function, which position or condition will be hereinafter referred to as a release position or condition. As will be appreciated, when the side support portion 3L is in the release position, the side support portion 3L can be effectively prevented from interfering with the passenger P when the passenger P gets in and out of the vehicle seat 1. As a result, when the side support portion 3L is tilted to such a position, the passenger can smoothly get in and out of the vehicle seat 1. Further, the release position or condition can be referred to as a welcome position or condition. In FIG. 1, the welcome position of the side support portion 3L is indicated by broken lines.

Thus, the heights of the side support portion 3L relative to the seat cushion central portion 3C can be adjusted by tilting the side support portion 3L (the tilting plate 11L) within the use range. In addition, the side support portion 3L can be shifted to the release condition by further tilting the side support portion 3L downwardly beyond the use range.

Similarly, as best shown in FIG. 2, the drive mechanism DR of the vertical moving device 20 is generally arranged and constructed to tilt the side support portion 3R (the tilting plate 11R) within a use range thereof in which the side support portion 3R substantially has side support function, i.e., between an uppermost use position shown by broken lines and a lowermost use position shown by solid lines. However, unlike the drive mechanism DL, the drive mechanism DR is not arranged and constructed to further tilt the side support portion 3R (the tilting plate 11R) downwardly beyond the use range. That is, the side support portion 3R (the tilting plate 11R) may preferably be prevented from downwardly tilting beyond the use range (the lowermost use position) by means of a stopper mechanism (not shown).

Thus, the heights of the side support portion 3R relative to the seat cushion central portion 3C can be adjusted by tilting the side support portion 3R (the tilting plate 11R) within the use range.

Further, the drive mechanisms DR and DL of the vertical moving device 20 are respectively arranged and constructed such that the side support portions 3R and 3L (the tilting plates 11R and 11L) can be laterally tilted within their use ranges in substantially synchronism with each other. Also, the drive mechanism DL is arranged and constructed to tilt the side support portion 3L (the tilting plate 11L) to the release (welcome) position beyond the use range thereof independently of the side support portion 3R.

Further, the side support portion 3L can be automatically tilted toward the release position beyond the use range when a vehicle door (not shown) is opened. That is, when the vehicle door is opened, the vertical moving device 20 is actuated based on a door opening signal from a sensor (not shown) that is disposed in the vehicle door opening, so that the side support portion 3L can be automatically tilted toward the release position beyond the use range. To the contrary, the side support portion 3L can be automatically tilted from the release position to the use range when the vehicle door is closed. That is, when the vehicle door is closed, the vertical moving device 20 is actuated based on a door closing signal from the sensor, so that the side support portion 3L can be automatically tilted toward the use range from the release position.

Next, the vertical moving mechanism 10 will be described in detail.

The motor 21 of the vertical moving device 20 is positioned under the seat cushion 3 and is fixedly connected to a vehicle floor F. The motor 21 is arranged so as to be actuated by moving an operation lever L (FIG. 1) that is attached to an appropriate portion of the vehicle seat 1. The lever L may preferably be constructed to turn on and off the motor 21 or to change rotation of direction (normal or reverse direction) of the motor 21. In this embodiment, when the lever L is rotated forwardly, the motor 21 is rotated in normal direction, so that the side support portions 3R and 3L (the tilting plates 11R and 11L) can be rotated or moved downwardly. To the contrary, when the lever L is rotated rearward, the motor 21 is rotated in the reverse direction, so that the side support portions 3R and 3L (the tilting plates 11R and 11L) can be rotated or moved upwardly. Thus, the side support portions 3R and 3L (the tilting plates 11R and 11L) can be controllably rotated between the uppermost and lowermost use positions (i.e., within the use range).

Further, when the lever L is released, the motor 21 is deactuated or stopped, so that rotational motion of the side support portions 3R and 3L (the tilting plates 11R and 11L) can be stopped. Thus, the side support portions 3R and 3L (the tilting plates 11R and 11L) can be maintained at desired rotational positions.

Further, the motor 21 is arranged to be actuated based on the door opening or door closing signal from the sensor that is disposed in the vehicle door opening. As will be appreciated, when the door opening signal is transmitted to the motor 21, the motor 21 is rotated in the normal direction, so that the side support portions 3R and 3L (the tilting plates 11R and 11L) can be rotated or moved downwardly. To the contrary, when the door closing signal is transmitted to the motor 21, the motor 21 is rotated in the reverse direction, so that the side support portions 3R and 3L (the tilting plates 11R and 11L) can be rotated or moved upwardly.

As previously described, each of the tilting plates 11R and 11L is laterally rotatably or tiltably attached to a cushion frame 3F via the front and rear hinge pins 11h (FIG. 4). Further, as described above, the tilting plates 11R and 11L are respectively movably linked to the drive mechanisms DR and DL of the vertical moving device 20. In particular, the drive mechanisms DR and DL respectively include hinge members 11t, linking members 12R and 12L, screw rods 24R and 24L and nuts 25R and 25L. As best shown in FIG. 4, the hinge members 11t are respectively attached to the tilting plates 11R and 11L. Further, upper ends of the linking members 12R and 12L are respectively rotatably connected to the hinge members 11t via pins 12a. Conversely, lower ends of the linking members 12R and 12L are respectively rotatably connected to the nuts 25R and 25L via pins 12b that are associated with the nuts 25R and 25L. The nuts 25R and 25L respectively threadably engage the screw rods 24R and 24L, so as to move therealong when the screw rods 24R and 24L are rotated.

As best shown in FIG. 3, the screw rods 24R and 24L are respectively substantially horizontally positioned at both sides of the seat cushion 3 so as to longitudinally extend therealong, and are rotatably connected to the vehicle floor F via brackets 24a. Further, as shown in FIGS. 3 and 4, forward ends of the screw rods 24R and 24L are respectively threadably engage the drive shafts 22 via the couplers 23, so that the screw rods 24R and 24L can be rotated in synchronism with each other when the motor 21 is actuated. Each of the couplers 23 may preferably include, for example, but is not limited to, a worm and worm wheel assembly.

Figure 6:
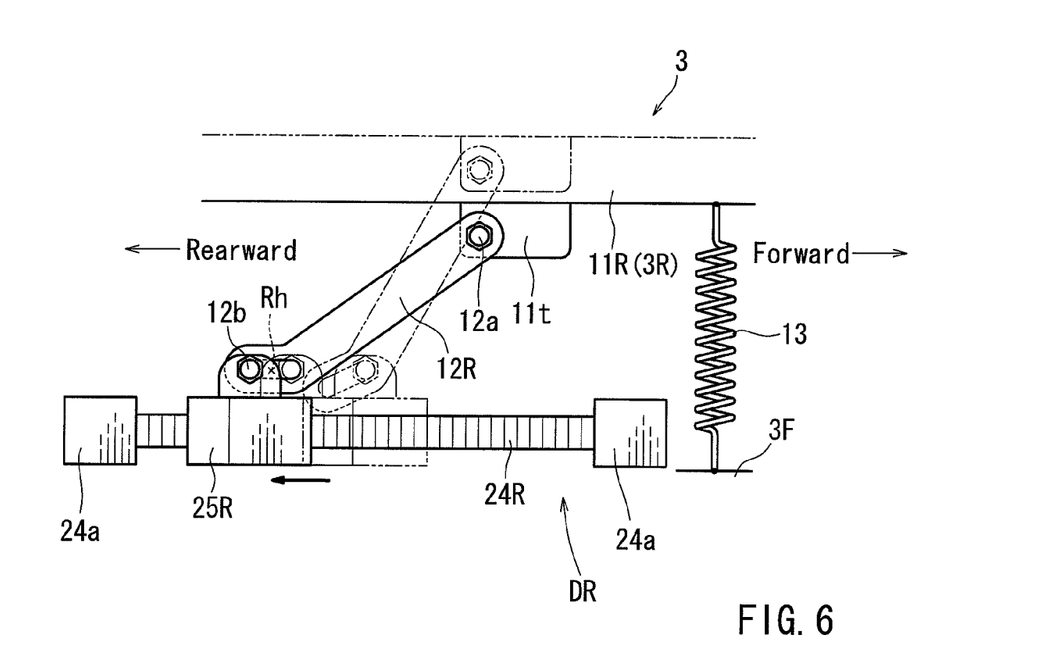
FIG. 6 is a schematic side view of a first drive mechanism corresponding to the first side support portion that is spaced away from the vehicle door opening.

Further, as best shown in FIG. 6, the linking member 12R (a first member) of the drive mechanism DR has a bent portion that is formed in the lower end thereof. The bent portion of the linking member 12R has an elongated slot Rh that is formed therein. The elongated slot Rh may preferably be shaped to be substantially horizontally oriented (i.e., to be substantially parallel to the screw rod 24R) when the tilting plate 11R (the side support portion 3R) is stopped by means of the stopper mechanism (i.e., when the tilting plate 11R reaches the lowermost use position thereof shown by solid lines in FIG. 6). The pin 12b associated with the nut 25R (a second member) slidably engages the elongated slot Rh, thereby forming an elongated slot-pin connection. Thus, a drive force absorption mechanism is formed in the drive mechanism DR. The drive force absorption mechanism thus constructed can absorb a drive force of the motor 21, so as to prevent the drive force from transmitting to the tilting plate 11R (the side support portion 3R).

In addition, as shown in FIG. 6, an extension spring 13 is provided between the tilting plate 11R and the cushion frame 3F, so that the tilting plate 11R can be normally biased downwardly via a spring force of the extension spring 13. As a result, the linking member 12R is normally biased such that the lower end thereof is biased rearward (leftward in FIG. 6). Therefore, as shown by broken lines in FIG. 6, the pin 12b is normally pressed to a forward end periphery of the elongated slot Rh.

Operation of the vehicle seat 1 (the vertical moving mechanism 10) will now be described.

First, when the vehicle door is opened in order to get in the vehicle seat 1, the motor 21 is rotated in the normal direction based on the door opening signal from the sensor. Upon actuation of the motor 21, the screw rods 24R and 24L of the drive mechanism DR and DL are respectively rotated in normal directions, so that the nuts 25R and 25L respectively move rearward therealong. As a result, as shown in FIGS. 5 and 6, the tilting plates 11R and 11L are respectively tilted downwardly toward the lowermost use positions thereof via the linking members 12R and 12L.

Figure 5:
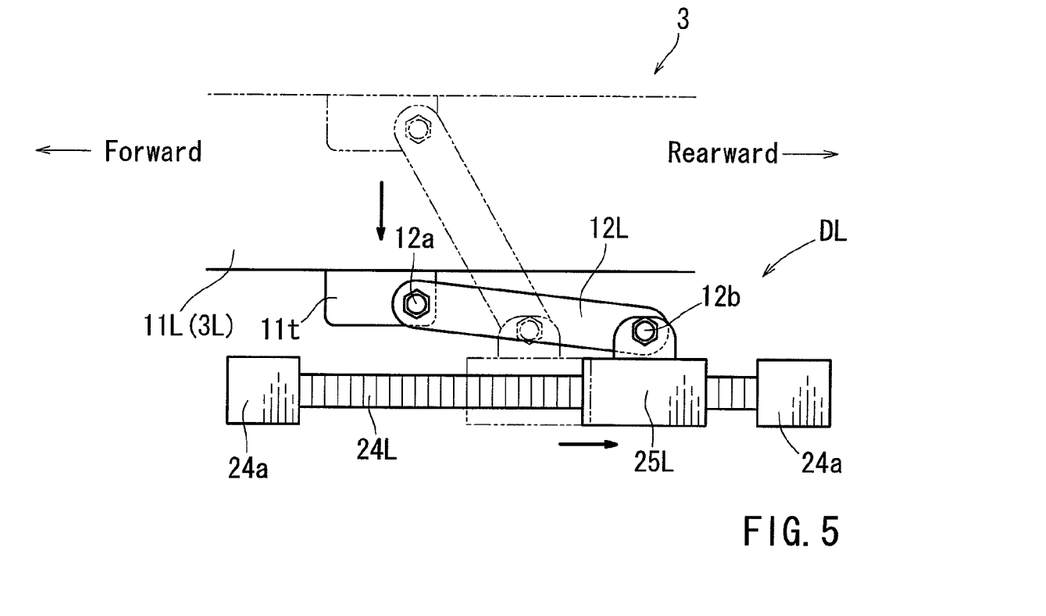
FIG. 5 is a schematic side view of a second drive mechanism corresponding to the second side support portion that is adjacent to a vehicle door opening.

When the screw rods 24R and 24L are further rotated, the nut 25L of the drive mechanism DL further moves rearward along the screw rod 24L, so that the tilting plate 11L can be further tilted downwardly to the release (welcome) position via the linking member 12L, which position is shown by solid lines in FIG. 5. As a result, the side support portion 3L (the tilting plate 11L) can be changed to the release position shown by bold solid lines in FIG. 2. Therefore, the passenger can smoothly get in the vehicle seat 1.

Conversely, the tilting plate 11R, when reaches the lowermost use position shown by solid lines in FIG. 6, can be prevented from further downwardly tilting by means of the stopper mechanism. Therefore, the side support portion 3R (the tilting plate 11R) can be maintained at the lowermost use position shown by solid lines in FIG. 2.

At this time, similar to the nut 25L of the drive mechanism DL, the nut 25R of the drive mechanism DR can further move rearwardly along the screw rods 24R. However, the nut 25R of the drive mechanism DR can move rearwardly along the screw rods 24R while sliding the pin 12b associated with the nut 25R along the elongated slot Rh formed in the linking member 12R. That is, the nut 25R of the drive mechanism DR can move idly rearwardly along the screw rods 24R due to the drive force absorption mechanism. Thus, the drive mechanism DR can be driven idly. Therefore, the drive force of the motor 21 can be effectively absorbed, so as to be prevented from transmitting to the linking member 12R via the nut 25R. As a result, after the tilting plate 11R reaches the lowermost use position, the motor drive force can be prevented from transmitting to the tilting plate 11R (the side support portion 3R).

When the vehicle door is closed after the passenger P sits the vehicle seat 1, the motor 21 is rotated in the reverse direction based on the door opening signal from the sensor. Upon actuation of the motor 21, the screw rods 24R and 24L are respectively rotated in reverse directions, so that the nut 25L moves forward along the screw rod 24L. As a result, the tilting plate 11L (the side support portion 3L) is returned from the release position to the use range thereof via the linking member 12L. Thus, both of the side support portions 3R and 3L (the tilting plates 11R and 11L) can be positioned in the use ranges thereof, so as to laterally support the femoral portions of the passenger P.

At this time, the nut 25R moves forwardly along the screw rods 24R while reversely sliding the pin 12b associated with the nut 25R along the elongated slot Rh formed in the linking member 12R. That is, the nut 25R moves idly forwardly along the screw rods 24R. Therefore, the drive force of the motor 21 can be prevented from transmitting to linking member 12R via the nut 25R.

In the use ranges of the side support portions 3R and 3L, the side support portions 3R and 3L can be rotated or moved upwardly and downwardly by operating the lever L, so that the heights of the side support portions 3R and 3L relative to the seat cushion central portion 3C can be freely changed. Thus, the restraint performance of the femoral portions of the passenger P can be controlled for the body size of the passenger P.

Further, when the vehicle door is opened in order to get out of the vehicle seat 1, the side support portion 3L (the tilting plate 11L) is moved to the release position shown by bold solid lines in FIG. 2 in the same manner as described above. Therefore, the passenger can smoothly get out of the vehicle seat 1.

According to the vehicle seat 1 of the present embodiment, the side support portions 3R and 3L can be freely vertically moved within the use ranges thereof. Therefore, it is possible to change the restraint performance of the femoral portions of the passenger P. In addition, the side support portion 3L can be moved to the release position in which it is substantially flush with the central portion 3C of the seat cushion 3. Therefore, the side support portion 3L cannot interfere with the passenger P when the passenger P gets in and out of the vehicle seat 1.

Further, the drive force absorption mechanism of the drive mechanism DR is simply composed of the elongated slot Rh formed in the linking member 12R and the pins 12b associated with the nut 25R. Therefore, the drive force absorption mechanism may have a simple structure.

Second Detailed Representative Embodiment

The second detailed representative embodiment will now described in detail with reference to FIG. 7.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, in place of the elongated slot Rh that is formed in the bent portion of the linking member 12R, an elongated slot Th may preferably be formed in the hinge member 11t (the first member) that is attached to the tilting plate 11R. The elongated slot Th may preferably be shaped to be substantially horizontally oriented (i.e., to be substantially parallel to the screw rod 24R).

The pin 12a associated with the linking member 12R (the second member) slidably engages the elongated slot Th formed in the hinge member 11t, thereby forming the elongated slot-pin connection. Thus, similar to the first embodiment, the drive force absorption mechanism is formed in the drive mechanism DR. Further, as shown by broken lines in FIG. 7, the pin 12a is normally pressed to forward end periphery of the elongated slot Th via the spring force of the extension spring 13.

Figure 7:
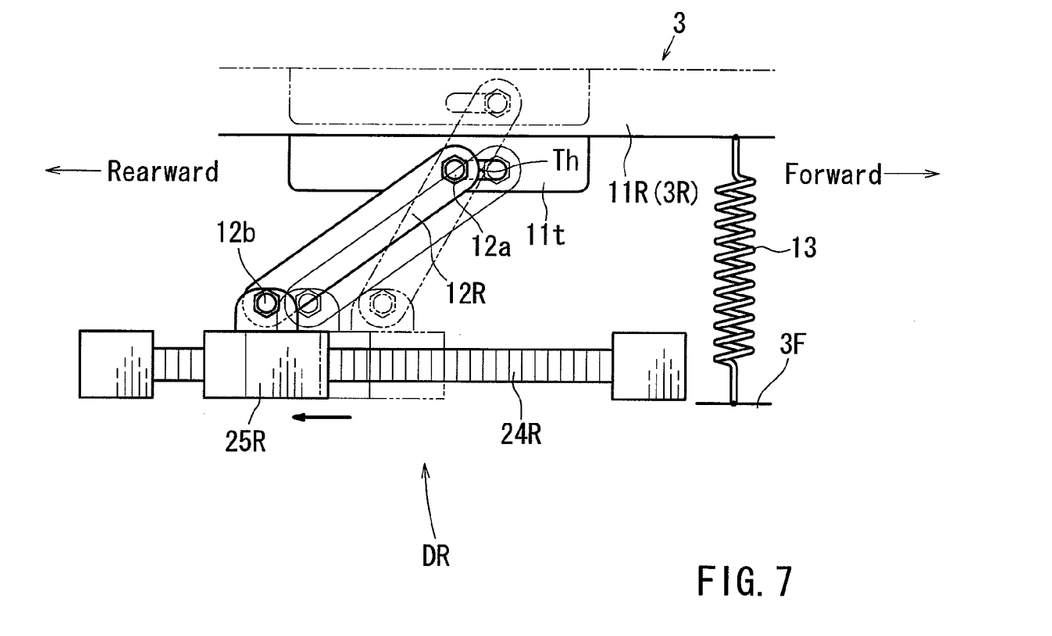
FIG. 7 is a view similar to FIG. 6 in a vehicle seat according to a second representative embodiment of the present invention.

According to the vehicle seat 1 of the second embodiment, after the tilting plate 11R reaches the lowermost use position shown by solid lines in FIG. 7, the nut 25R of the drive mechanism DR can further move rearwardly along the screw rods 24R with the linking member 12R while sliding the pin 12a associated with the linking member 12R along the elongated slot Th formed in the hinge member 11t. That is, the nut 25R can move idly rearwardly along the screw rods 24R due to the drive force absorption mechanism. Thus, similar to the first embodiment, the drive mechanism DR can be driven idly. Therefore, the drive force of the motor 21 can be absorbed, so as to be prevented from transmitting to the linking member 12R via the nut 25R. As a result, similar to the first embodiment, after the tilting plate 11R reaches the lowermost use position, the motor drive force can be prevented from transmitting to the tilting plate 11R (the side support portion 3R).

Naturally, various changes and modifications may be made to the present invention without departing from the scope of the invention. For example, in the embodiments, the tilting plate 11L (the side support portion 3L) is constructed to be tilted to the position in which it is substantially flush with the central portion 3C of the seat cushion 3. However, the tilting plate 11R (the side support portion 3R) can instead be constructed to be tilted to a position in which it is substantially flush with the central portion 3C of the seat cushion 3, if necessary.

What is claimed is:

1. A vehicle seat having a seat cushion, the seat cushion comprising:
   a central portion;
   first and second side support portions configured to laterally support femoral portions of a passenger, and
   a vertical moving mechanism having first and second drive mechanisms linked to each other and respectively linked to the first and second side support portions so as to move the first and second side support portions in synchronization with each other,
   wherein each of the first and second drive mechanisms comprises a screw rod and a nut threadably engaging the screw rod, each of the first and second drive mechanisms being configured to vertically move each of the first and second side support portions within a use range defined by movement of the nut along the screw thread between an uppermost use position and a lowermost use position,
   wherein the first drive mechanism comprises a drive force absorption mechanism comprising a first member having an elongated slot and a second member having a pin, the elongated slot and the pin being slidably engaged with each other, wherein the first drive mechanism further comprises an extension spring that is positioned between the first side support portion and the seat cushion, so that the first side support portion is biased downwardly, wherein the first side support portion is rotatably connected to the nut of the first drive mechanism via the drive force absorption mechanism such that transmission of a drive force of the first drive mechanism to the first side support portion can be prevented when the first side support portion reaches the lowermost use position, and wherein the second side support portion is rotatably connected to the nut of the second drive mechanism such that a drive force of the second drive mechanism can be transmitted to the second side support portion even after the second side support portion reaches the lowermost use position.

2. The vehicle seat as defined in claim 1, wherein the second side support portion is positioned adjacent to a vehicle door opening.

* * * * *